Figure 1:
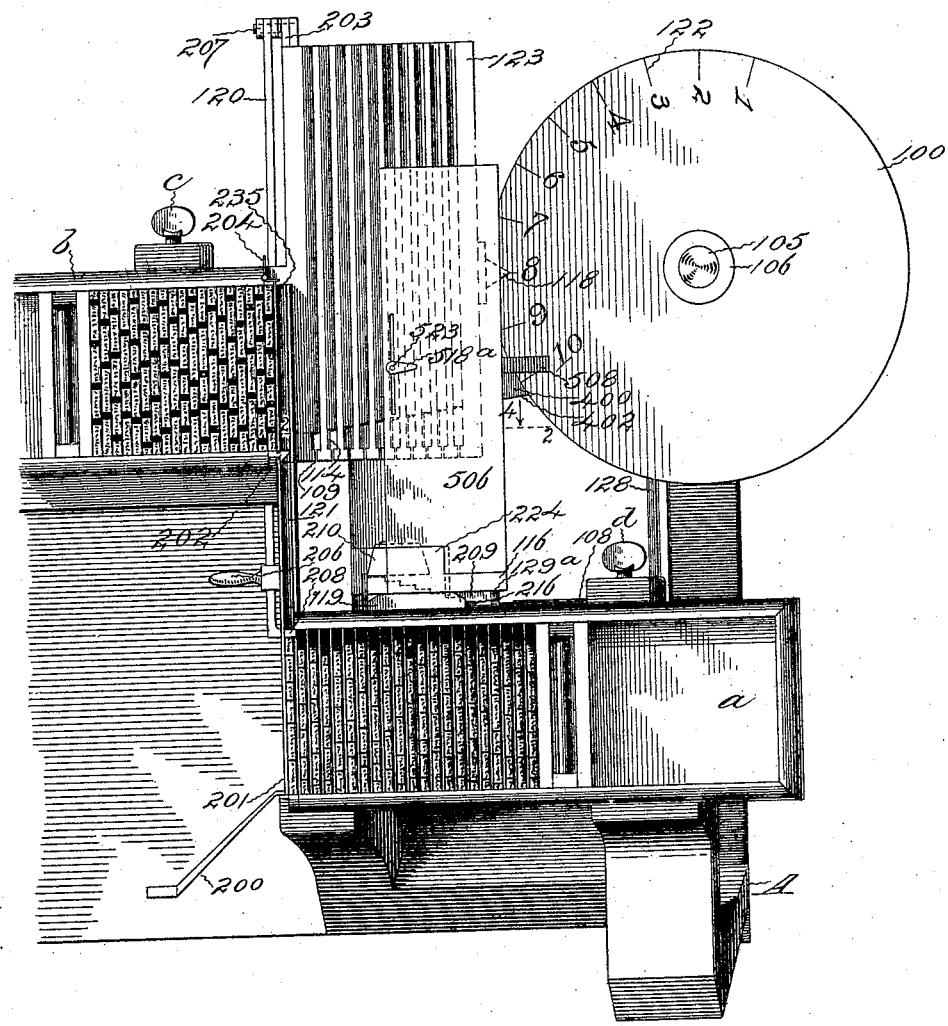

No. 844,560.

PATENTED FEB. 19, 1907.

B. M. DES JARDINS.
TYPE JUSTIFIER.
APPLICATION FILED JULY 1, 1895. RENEWED JUNE 5, 1906.

6 SHEETS—SHEET 1.

Witnesses:

Inventor:
Benj. M. Desjardins

No. 844,560. PATENTED FEB. 19, 1907.
B. M. DES JARDINS.
TYPE JUSTIFIER.
APPLICATION FILED JULY 1, 1895. RENEWED JUNE 5, 1906.
6 SHEETS—SHEET 2.
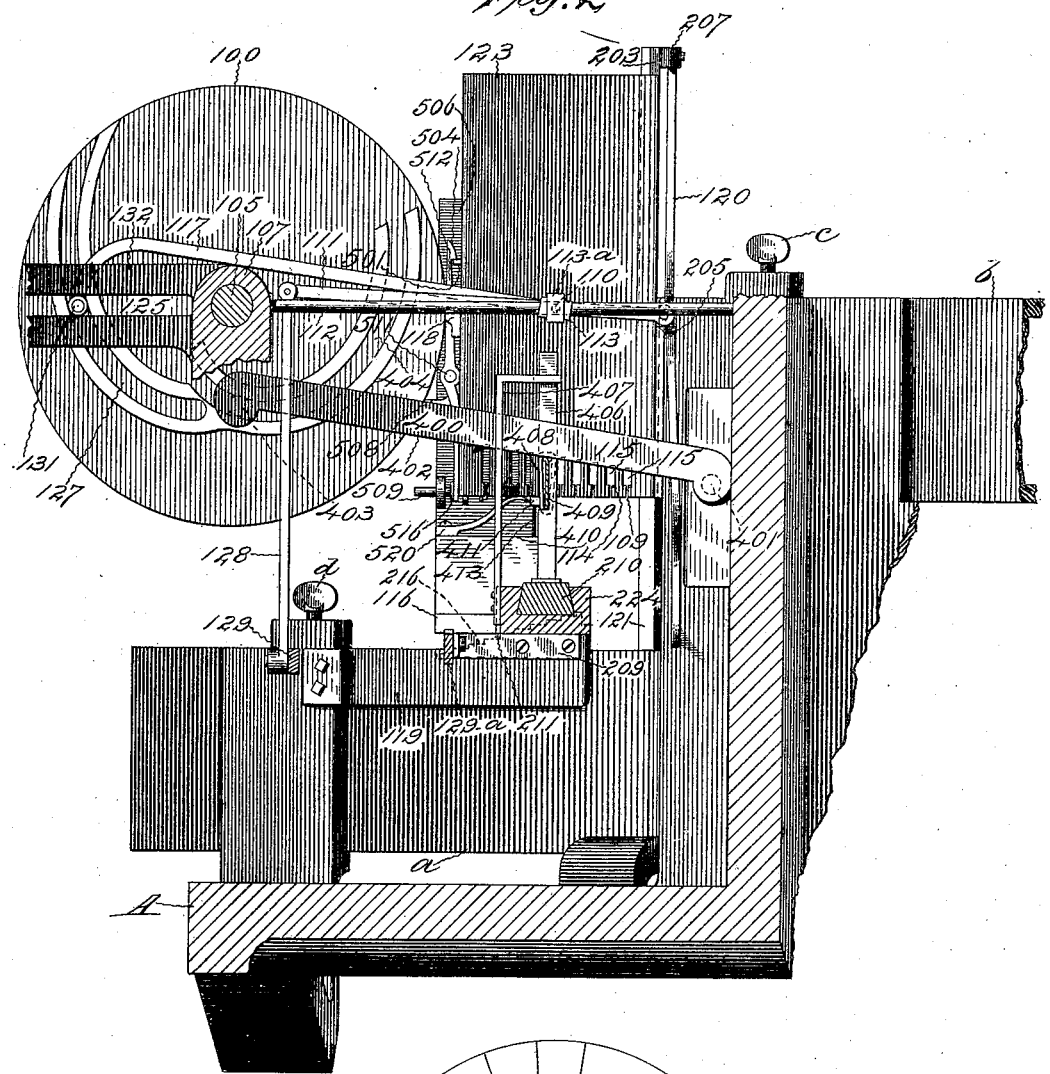
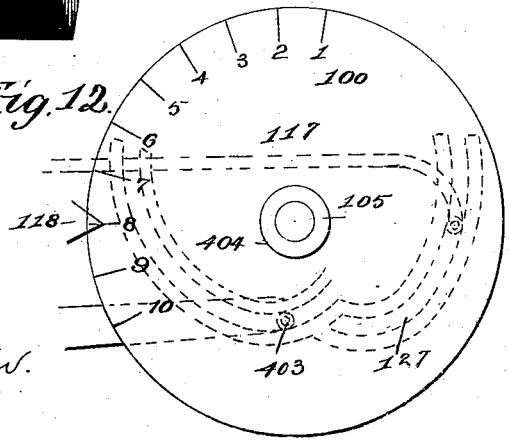

No. 844,560. PATENTED FEB. 19, 1907.
B. M. DES JARDINS.
TYPE JUSTIFIER.
APPLICATION FILED JULY 1, 1895. RENEWED JUNE 5, 1906.

6 SHEETS—SHEET 3.

Witnesses:

Inventor:

No. 844,560. PATENTED FEB. 19, 1907.
B. M. DES JARDINS.
TYPE JUSTIFIER.
APPLICATION FILED JULY 1, 1895. RENEWED JUNE 5, 1906.

6 SHEETS—SHEET 4.

Witnesses:
F. A. Cutter.
E. S. Shelton.

Inventor:
B. M. DesJardins

No. 844,560. PATENTED FEB. 19, 1907.
B. M. DES JARDINS.
TYPE JUSTIFIER.
APPLICATION FILED JULY 1, 1895. RENEWED JUNE 5, 1906.

6 SHEETS—SHEET 5.

Witnesses:
H. A. Cutter.
E. S. Shelton.

Inventor:
Benj. M. DesJardins

No. 844,560.
PATENTED FEB. 19, 1907.
B. M. DES JARDINS
TYPE JUSTIFIER.
APPLICATION FILED JULY 1, 1895. RENEWED JUNE 5, 1906.
6 SHEETS—SHEET 6.
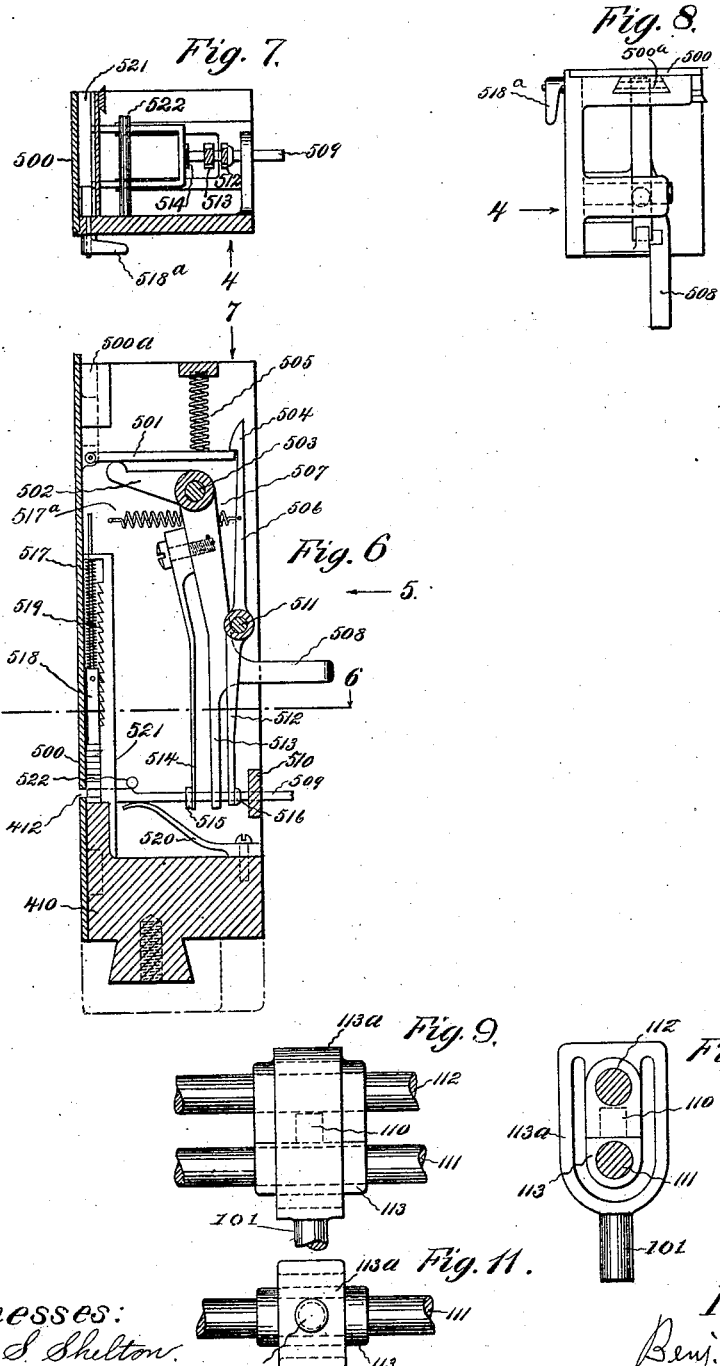
Witnesses:
Eva S. Shelton.
Edward E. Claussen.
Inventor:
Benj. M. Des Jardins
THE NORRIS PETERS CO., WASHINGTON, D. C.

UNITED STATES PATENT OFFICE.

BENJAMIN M. DES JARDINS, OF HARTFORD, CONNECTICUT, ASSIGNOR, BY MESNE ASSIGNMENTS, TO THE UNITYPE COMPANY, A CORPORATION OF NEW JERSEY.

TYPE-JUSTIFIER.

No. 844,560.      Specification of Letters Patent.      Patented Feb. 19, 1907

Application filed July 1, 1895. Renewed June 5, 1906. Serial No. 320,227.

*To all whom it may concern:*

Be it known that I, BENJAMIN M. DES JARDINS, a citizen of the United States, residing at Hartford, in the county of Hartford and State of Connecticut, have invented a new and useful Type-Justifier, of which the following is a specification.

This invention relates to type-justifiers, and particularly to improved means for locating the size of spaces required to justify the line of type being acted upon.

The means referred to consist of a dividing instrument so constructed that when one of its members is placed against the end of an incomplete line and another disposed to indicate the number of spaces which said line is to contain a third member is caused by these several adjustments to point out, identify, or select the particular size of spaces required to justify said line.

The improvement further consists of means for adjusting a space-plunger blade with reference to the end of a column of spaces, so that it will engage the requisite number of the particular size of spaces opposite which it happens to be located. The scope or travel of the directing elements is uniformaly increased or decreased thereby to bring about the different adjustments of said space-plunger blade necessary to correspond with the increase or decrease of the space piles wanted, as different numbers of spaces are needed for different lines.

The means referred to consist of certain locating or limiting elements adjustable to correspond to the height of any space pile which is liable to be required, the adjustment being controlled by the number of places for spaces in the line.

A lever located above the space-plunger blade and behind the space-magazine channels is also employed in this invention, said lever being suitably pivoted and capable of being swung to describe an arc of a dimension equivalent to the number of spaces required in a given type-line and corresponding to the height of the particular pile of the various available sizes necessary for justifying said line.

The improvement further embraces means for transferring spaces from any given one of a plurality of space-channels located at various positions to a fixed position within the type-line channel by bringing a space-plunger blade and as much of a column of spaces as is required to fill the line shortage into contact, whereby the latter are transferred by the former into an intermediate receiving device adapted to be moved with the space-pile so transferred to a position adjoining the line-channel, said spaces being again moved one at a time out of said intermediate receiving device into their respective places between the words.

In the following specification I shall term the difference between the amount of matter in an unjustified line and the required length of the line or column measure the "shortage" of the line. The places between words in which justifying-spaces are to be inserted I shall term "intervals," and the final quads or pieces used to separate the words in the justified line will be termed "justifying-spaces."

A type-justifier embodying the novel form of measuring instrument and suitable mechanism for rendering operative the means hereinbefore referred to is fully illustrated in the accompanying specification and annexed drawings, forming a part thereof, in which—

Figure 3:
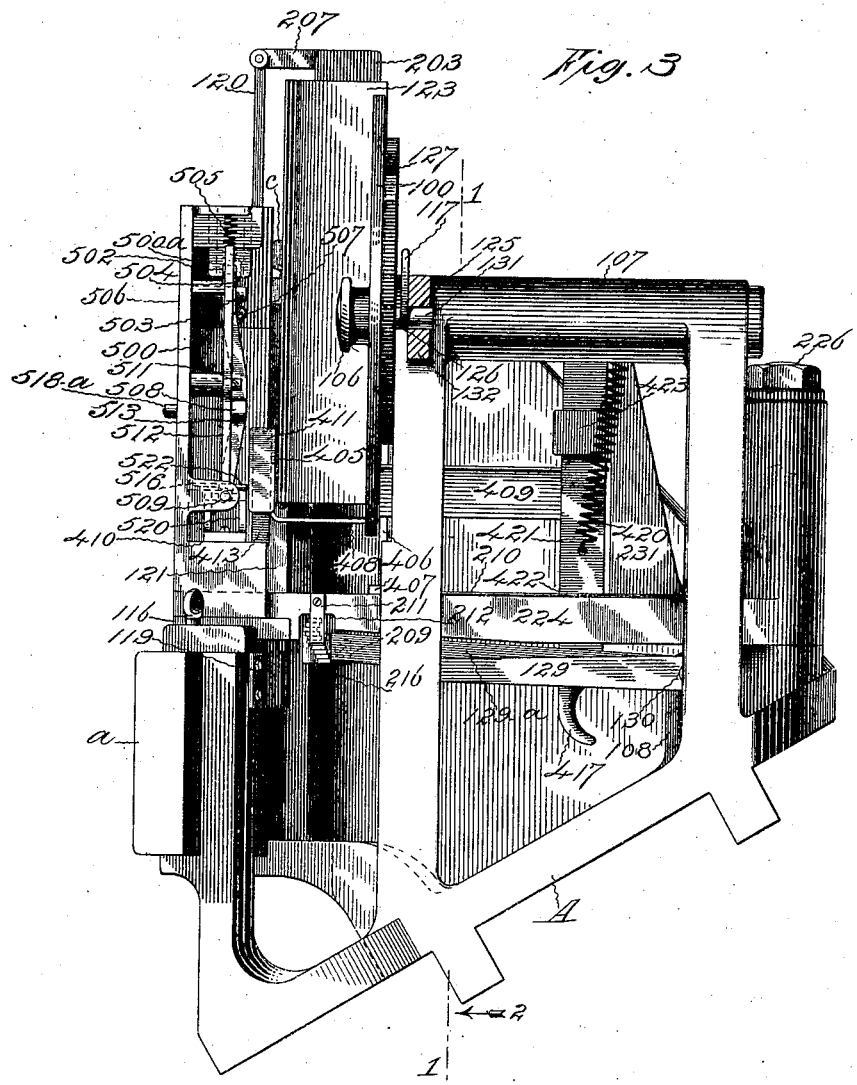
Figure 4:
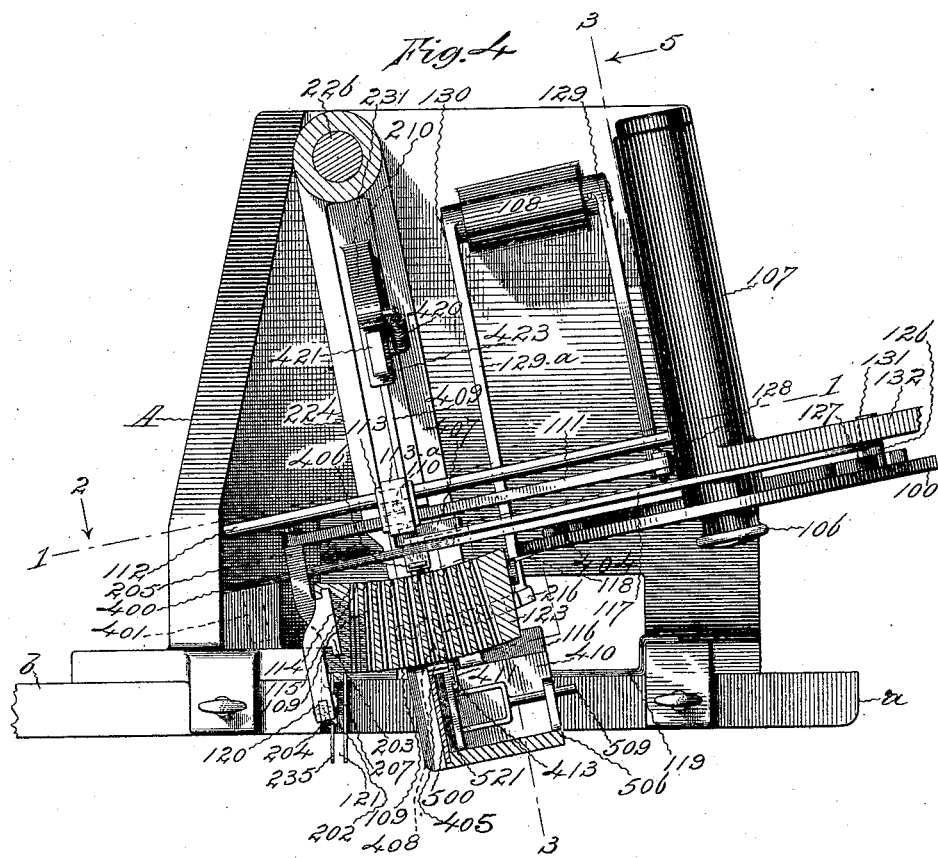
Figure 5:
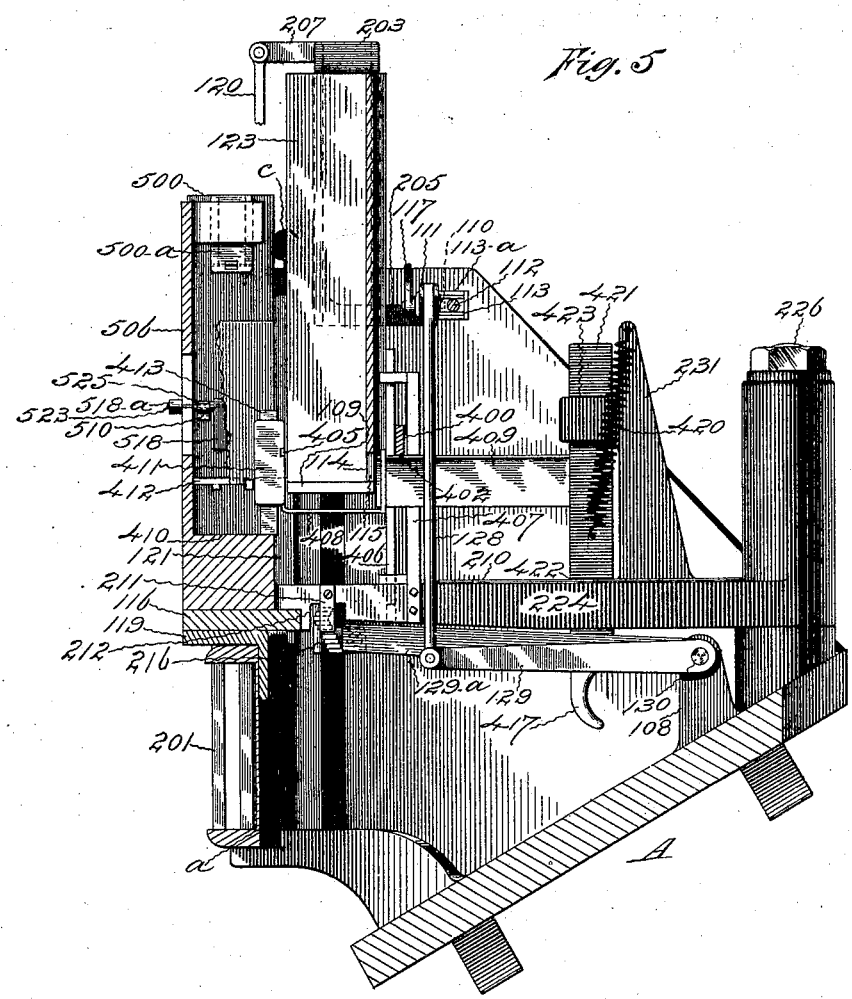

Figure 1 is a front elevation of the machine; Fig. 2, a rear elevation and section on lines 1 1, Figs. 3 and 4, in the direction of the arrow 2, the longer portion of the frame immediately behind the disk being also removed; Fig. 3, a right end elevation and view of the intermediate space-transferring mechanism; Fig. 4, a plan view of said machine in general and a horizontal section through the space-magazine on lines 2 2, Fig. 1, in the direction of the arrow 4 and through the case for said intermediate space-transferring mechanism above the plunger; Fig. 5, a transverse vertical section in the direction of the arrow 5 on the various broken lines marked 3, Fig. 4, which indicate that said section is on different elevations, the better to show the several parts desired to be illustrated by this figure; Fig. 6, an enlarged sectional view of said intermediate space-transferring mechanism on lines 4 4, Figs. 4 and 7, in the direction of the arrow 6; Fig. 7, a horizontal sectional view of said mechanism on lines 5 5 in the direction of the arrow 7, Fig. 7; Fig. 8, a top view of Fig. 6; Fig. 9, an enlarged plan view of the fulcrum-block and connections; Fig. 10, an end view of the same; Fig. 11, a front side view, and Fig. 12 is a front view of the cam-disk.

Similar letters and figures of reference designate like parts in the drawings and specification.

The machine is inclined backward at a suitable angle to handle loose type lines and spaces, but in the several views is shown as standing in a vertical position with the frame inclined wherever it appears, and the specification is drawn to describe said machine in this position for the sake of convenience and brevity.

The reference-numerals conform generally to the following order: The figures below 100 refer to the broken lines and indicating-arrows used to show approximately at what part of the several views the correlative views are taken. The figures from the first two hundred numbers above and including 100 refer to the primary measuring elements and other mechanism in general. Those above and including 400 refer in a general way to the parts which transfer the spaces from their channels, and those above and including 500 to the intermediate space receiving and transferring device. The main frame is designated by the letter A, the galley for the unjustified column of type by $a$, and the galley for the justified column by $b$. The galleys $a$ and $b$ are held in place by the thumb-screws $c$ and $d$. The measuring element of the main calculating instrument is designated by the figure 111. This measuring element for determining the appropriate sizes of spaces to be used in different type-lines is included in the proportional bar 111, which is fulcrumed to the block $113^a$, reciprocally mounted on the guide-bar 112, said bar being rigidly fastened at each end to the frame A. The bar 111 is connected to the fulcrum-block $113^a$ by means of the fulcrum-sleeve 113, loose on said bar, having the pivot 110 bearing in the center of said block midway of the ends thereof. This arrangement provides for a longitudinal and independent movement of said bar relative to said sleeve and block and a swinging motion relative to said fixed bar, as well as a reciprocal movement of said block on the latter. The front end of the block $113^a$ is provided with the stud 101, to which the left end of the rod 117 is pivoted.

The galleys $a$ and $b$ are located at the front of the machine, the latter on a higher plane than the former, and their adjacent ends terminate in the open line-receiving channel 121. The lower galley $a$ for the reception of the column of loose, leaded, unjustified type is located to the right, at the lower end of the channel 121. The space-channel magazine 123 is securely attached to the front of the frame A above the level of the galley $a$, and the lower side of the galley $b$ is on the same plane with the bottoms of the channels in said magazine, but slightly in front of them. The right end of the upper galley $b$, into which the justified lines are fed, is over the left end of the galley $a$. The line-channel 121, through which the lines pass from one galley to the other, has those portions of the walls removed which would otherwise intervene between the interior of said channel and of said galleys. The wall of the channel 121 opposite the right end of the galley $b$ is supplemented by the removable rule 235, the lower end of which fits into a shallow groove in the upper end of the left wall 201 of said channel, and the top is held in place by the weighted latch 204, pivotally attached to the galley $b$. The left wall of said line-channel is provided with the flat spring-catch 202 to support whatever part of the line may be in the upper end of the channel adjacent to the galley $b$. The top of the catch 202 is on a line with the lower side of said galley $b$.

The cam-disk 100 is mounted at the front of the machine on the stud 105, which revolves in the frame-bearing 107 and is provided on its front end with the knurled knob 106, by means of which said disk is rotated. On the front face of the disk 100 is the graduated scale 122, registering with the pointer 118, fast to the left side of the reservoir 123. The disk 100 is designed to be turned by hand for the purpose of bringing the proper mark on the scale 122 in line with the pointer 118 to designate the number of required spaces in a given type-line. On the back of the disk 100 are the cam-grooves 127 and 404 for operating the rod 117 and the space-pile-limiting gage or lever 400. The latter is pivoted at 401 to the frame A, extends to the right close behind the magazine 123, and has its projection or roller 403 in the groove 404, and when the disk 100 is rotated said lever swings up or down on its pivot, according to the direction given to said disk. The left end of the rod 117 is connected to the fulcrum-block $113^a$ by the pivot 101, and the right end of said rod has the rollers 126 and 131, the former operating in the disk-cam groove 127 and the latter in the horizontal groove-guide 125 of the projection 132 from the bearing 107. The arrangement of the groove-guide 125 and the cam-groove 127 provides for a longitudinal movement of the rod 117 when the disk 100 is turned right or left, according to the direction given said disk, and a coincident movement of the fulcrum-block $113^a$ along the bar 112 necessarily takes place. The position of the lever 400 with reference to the magazine-channels 123 and their distances apart is such that the angle of its inclination as it is swung on the pivot 401 makes a tapering gage with measuring-points corresponding to the positions of said channels, at each of which points the opening in this gage is equal to enough of the lower end of the corresponding space-column to include the number of spaces wanted.

The curve of the cam-groove 404, which operates the lever 400, is such that every time one of the graduations on the scale 122 passes the pointer 118 said lever makes an angle with the bottom of the spaces in the magazine-channels 123, but behind the same, of a measuring capacity equal in depth to the thicknesses of as many spaces in each and all of said channels as the number indicated by said scale and pointer. In other words, the vertical distances between the bottoms of the space-channels 123 and corresponding points along the working edge 402 of the lever 400, behind the respective space-columns, are equal to piles of spaces containing as many as are registered by the scale 122. For instance, if the graduation 8 on the scale 122 registers with the pointer 118 the vertical distance from the bottom of each channel 123 to the edge 402 is equal to eight times the thickness of a single space contained therein. The time of the cam-groove 127, which operates the rod 117, the fulcrum-block 113$^a$, and the fulcrum-sleeve 113 is so arranged that whatever graduation on the scale 122 registers behind the pointer 118 the amount of motion thereby communicated to said block is sufficient to divide the bar 111 into the proportion required for its work.

The proportional bar 111 is connected, through the slide 203 and the arms 205 and 207, with the gage-rod 120, which is provided with the handle 206 below the galley $b$. The rod 120 also has the gage projection 208 at the lower end, and since said rod is loosely pivoted to the slide-arm 207, from which it swings, said projection can be brought onto the top of the type-line in the channel 121 and removed therefrom. The operator does this by grasping the handle 206, raising and lowering the rod 120, and swinging the projection 208 on its free lower end into and out of contact with the type-line in the channel 121, the swinging movement required being very slight. By means of the connections just described the gage-rod 120 is free to be drawn from a position representing the correct or full length of the line when justified to a position against the end of the short line, thus traversing a distance equal to the line shortage. This movement causes a corresponding displacement in the adjacent end of the bar 111. The remote end of the bar 111 is connected by the rod 128, the rock-shaft 130, and the arms 129 and 129$^a$ with the stepped gage-block 216, which is rigidly attached to the front end of said arm 129$^a$ by the angular plate 209. The rock-shaft 130 is journaled in the frame-bearing 108 at the rear of the machine.

The swinging ejector-arm 224 is sleeved to the stud 226, extending upward from the back of the frame A, and said arm projects forward to the position of the galleys $a$ and $b$ with its front terminal between the top and bottom planes of said galleys, respectively. The arm 224 supports the intermediate space-receiving device, described hereinafter, and is adapted to swing said device right and left from a position adjoining the channel 121 past all of the magazine-channels 123 for the purpose of transferring the spaces from any one of the latter to a position adjacent to the type-line. The dovetail slide 210 travels back and forth in a registering groove in the upper side of the arm 224 and is provided with the upright 231, which supports the plunger-guide 421. Said guide operates vertically in the upright bearings 422 and 423 and has the operating-handle 417, extending from the base thereof below the arm 224. The guide 421 is held with an upward tension by the coiled spring 420 between the upper end of the upright 231 and said guide. The T-shaped plunger-blade 409 is rigidly fastened at its rear end to the guide 421, and the front terminal of said blade reciprocates through the vertical post 406, sliding in suitable boxes or bearings connected to the rigid projection 407 from the arm 224. The guard 405 projects in front of the magazine-channels 123 at a position immediately above the top of the blade 409 to prevent more than the required number of spaces from being displaced by the action of said blade. This guard is connected indirectly to the plunger-blade 409 by means of the bent bar or brace 408, which passes from a position in front of and against the magazine 123 down under said magazine and up behind the same, where it is rigidly fastened to the sliding post 406. An opening is formed in the brace 408 and the post 406 for the reception of the blade 409. By this arrangement the bottom of the guard 405 and the top of the blade 409 always maintain the same relative position vertically. The guard 405 is guided in its vertical travel by the L-plate 411, to which said guard is attached, and the dovetail slideway 413. The way 413 is integral with the case 506, and the plate 411 is adapted to slide vertically thereon, thus preserving a rigid connection between the guard 405 and the blade 409, while providing for synchronous vertical movement of these parts, it being understood that said case is secured to the same arm 224 that carries said blade.

The bar 111, through its connections hereinbefore described, operates the adjustable stepped block 216, which is the means of locating the space-plunger blade 409 opposite the channel 123 containing the size of spaces required. The finger 211 is fastened to the right side of the arm 224 and depends into the path of the block 216, while said arm is cut away at 212 to permit the same to swing over said block and the front end of the arm 129$^a$. The block 216 is designed to intercept the swinging ejector-arm 224 through the medium of the finger 211, and the steps on said block may be constructed with convenient heights to properly check said arm without necessary reference to the difference between the successive sizes of spaces employed; but for convenience I prefer to make them with a difference between their heights ten times greater than the difference between said successive sizes, or equal to the difference between successive space piles of ten each, taken from successive columns in said magazine-channels. Each of said steps is therefore .050 of an inch high, or ten times .005 of an inch, which latter is the difference referred to in the previous sentence. The positions of said steps are also made to correspond relatively with the positions of the magazine-channels 123—that is, whenever the arm 224 is intercepted by one of said steps which represents a given size of spaces, as stated, the ejector represented by the blade 409 thereby becomes located opposite or adjacent to the channel containing said size of spaces. The fulcrum-block 113$^a$ is capable of adjustment so that the lengths of the two terminals of the bar 111 each side of said block are respectively proportional to the heights of the space piles containing the required number which is equal to the line shortage and the different space sizes represented by the block 216, its steps standing for said different sizes. This proportional adjustment is such that if said piles contain ten spaces the fulcrum is located approximately in the center of said bar, so that its downward displacement at the left end which comes into indirect contact with the type-line is the same as the upward displacement of the opposite end which raises said block; but if the piles contain less than ten spaces the fulcrum is located nearer the left end of the bar. The construction herein shown and described provides for handling only ten spaces at one time but if provision was made for more than that number; as it might be, and the pile contained over ten spaces the fulcrum would be located toward the right end of said bar. Said fulcrum is adjusted by means of the cam 127 on the disk 100, which through the connecting members imparts the longitudinal movement thereto necessary to maintain the proportion between the varying lengths of the two terminals of the bar 111 with reference to the number of spaces required to justify the line. As ten is the number of spaces to which the vertical dimensions of the successive steps of the block 216 correspond when the left end of the bar 11 is pulled down to the limit presented by an unjustified type-line with the fulcrum-sleeve 113 located at the center of the bar, the right end rises to whatever height is necessary for displacing said block a distance equal to the vertical dimension of a pile containing ten of the required size of spaces. The difference between that number of spaces and the number actually required in the line is called the "proportional" difference and is represented by the position of the fulcrum-sleeve 113 relative to the ends of said bar 111. Hence it will be seen that the size of spaces is always represented by the displacement of both ends of said bar, the difference being in the number required.

The following concrete examples, illustrating the method of determining the sizes of required spaces by this machine, are given to supplement and make clearer the foregoing description. I will assume that the unit of value adopted in the construction of the spaces is .005 of an inch, which is one-fifth of the thickness of the smallest of said spaces, and that the difference in thickness between consecutive sizes of spaces is one unit, or .005 of an inch, as before stated. The spaces are arranged in the ten channels 123 in the following order, commencing with the first channel at the left: .025 of an inch thick or the smallest size; second channel, .030''; third, .035'', and so on, increasing consecutively by .005'' until the tenth or right-hand channel is reached, where the largest size is represented, this being .070 of an inch in thickness. Assuming a type-line of nine words to be in the channel 121 and the disk 100 turned until its eighth graduation, representing the number of spaces in said line, is in alinement with the pointer 118, as shown in the drawings, it is obvious that the lever 400 will be disposed at the proper angle behind the channels 123 to limit the output of spaces from any one of said channels to eight and at the same time the fulcrum-sleeve 113, located along the bars 112 and 111 by the turning of said disk as aforesaid, so as to properly divide said bar 111 for the selection of the required size of spaces. The base of the channel containing the smallest spaces is approximately four of the steps of the block 216, or .200 of an inch above the lower edge of the gage 400, so that the block travels .200 of an inch from its normal position to the base of the smallest space-channel. In the case assumed, therefore, when the gage-rod 120 is brought down into the top of this line the bar 111 is so acted upon as to actuate the block 216 upward for a distance equal to .200'' plus .300'', or the height of six steps of said block, which gives .500'' for the total rise of the latter. The sixth step from the top of the block 216, counting the top step as the first, now lies in the path of the finger 211 and locates the arm 224 with the plunger-blade 409 directly behind the sixth channel 123 from the left, which contains the size of spaces necessary to justify a line of nine words having a shortage of .400'', or eight times .050'' the size of the spaces contained in said channel. A line requiring eight spaces with a shortage of .400'' will always require the sixth size of space, as noted above, provided, of course, that the same unit of value is used, and the arbitrary arrangement of the fulcrum-sleeve 113 relative to the bar 111, together with the displacement of the latter, must invariably cause the sixth step of the block 216 to be elevated into the path of the finger 211. Suppose the line calls for ten spaces (which is the limit of supply at any one time by this construction, although it will be readily seen that this limit can be increased) and the downward displacement of the left end of the bar 111 is equivalent to the sum total of ten of the largest spaces, or .700", the fulcrum-sleeve 113 being now located approximately at the center of said bar the block 216 is displaced upward the same distance as said downward displacement, the rise of said block being equal to .200" plus ten times .050", or .500", which gives .700", and the finger 211 encounters the lowest step of said block and locates the blade 409 directly back of the right-hand channel 123. If, however, the displacement of the left end of said bar is equivalent to the sum total of ten of the smallest spaces, or .250", the block 216 will rise .200" plus .050", (the height of one step,) or .250", and cause the blade 409 to be located adjacent to the left-hand channel 123. With only one .025" space in the line the changed position of the fulcrum of the bar 111 causes said block to rise .250", just as it did when there were ten spaces of that size; but the lever 400 limits the rise of the blade 409 to the capacity of one space only, said blade being located by the engagement of the finger 211 with the upper step of the block directly back of the left-hand channel 123, as in the previous example.

Having described the method of justifying incomplete lines of type so far as selecting the requisite size of spaces is concerned with the mechanism for doing the same, it becomes necessary next to set forth the mechanical means employed for introducing the selected spaces into said lines, which I will proceed to do.

The front and back of the space-magazine 123 correspond in form to arcs struck from the center of the pivot 226, thereby conforming to the travel of the plunger-blade 409 behind and the case 506 before. The bases of the channels 123 are provided with the slots 109, extending from front to back to accommodate the blade 409 in its longitudinal movement. The openings 115 are cut in the rear wall of the magazine 123 behind the channels and extend from the bases of said channels upward for distances equal to or a little greater than the heights of ten spaces of the sizes belonging therein. The opening 115 in the rear of the left-hand channel is a little more than .250", that in the rear of the right-hand channel a little more than .700", and the intermediate openings measure accordingly. The shoulder 114 appears at one side of each opening 115 to prevent the backward displacement of the bottom space or spaces by the return movement of the blade 409 when less than ten have been ejected forward. When a pile of spaces is dislodged by the forward movement of said blade, it is thrust into what is termed the "intermediate" receiving device. The case 506, which contains said device, is securely fastened on the forward end of the swinging ejector-arm 224, said arm having the plate 116 extending to the right to assist in supporting said case. The angle-iron 119 is attached to the frame A and extends beneath the front end of the arm 224 to serve as a slide-rest for said arm and the case 506, the left side of the former being removed flush with the latter and as far back as the magazine 123 to permit said case to be swung into position beside the channel 121. The receiving-channel 521 is located in the left end of said case directly in front of the blade 409, but on the opposite side of the magazine 123 when said blade is swung into position behind said magazine. The platform 410 constitutes the floor of the case 506. The receiving-channel 521 is formed by a fixed wall inside of the case 506 and the left wall of said case or the adjustable wall 500, which is adapted to slide up and down to form the opening 412 under its lower edge when raised.

Within the channel 521 is the spring-actuated block 518 and the space-plunger 509, provided with members for controlling the wall 500, the left end of said plunger being bifurcated. The bottom of the channel 521 is on a level or slightly below the bottom of the magazine-channels 123. The walls which form the channel 521 project upward from the platform 410, and said channel is directly in line with the space-plunger blade 409. When the latter is thrust forward against the selected spaces in any channel 123, they are pushed from the magazine directly into said receiving-channel, where said spaces appear piled up as originally. The internal wall of the channel 521 is provided with the ratchet-teeth 519, into which the pawl 510 is adapted to be engaged for the purpose of holding said block in a raised position while the space pile is being transferred under it. The latch 518[a] is attached to the front end of the stem 523, which extends forward through a slot in the front wall of the case 506. The pawl 510 is attached to the sleeve 525, rigid on the stem 523 between the front wall of the case 506 and the block 518, and is engaged or disengaged with the teeth 519 by turning the latch 518[a], the friction between the parts retaining it in whatever position the same may be placed. The elevated portion of the platform 410, that serves as a floor for the channel 521, is slotted to form a guide for the forked end of the space-plunger 509. A lug from the upper end of the internal wall of the channel 521 above the teeth 519 guides the block-rod 524, and the spiral spring 517 encircles said rod between said lug and block to normally press the latter downward on top of the space pile.

The movable wall 500 is provided with the dovetailed projection 500ª at the top, which slides in a registering groove in the case 506. The wall 500 is adapted to move up and down to adjust the opening 412, according to the thickness of the spaces in the channel 521, so that the bottom space can be thrust through said opening into the type-line without disturbing the one above it. The right end of the plunger 509 reciprocates in an opening in the case-lug 510ª, and the flat bifurcated spring 520 presses said plunger upward against the pin 522, extending between the front and rear walls of the case. The right end of the srping 520 is attached to the platform 410 and the bifurcations of said spring press beneath the bifurcations of the plunger.

The stud 503 extends into the case 506 from the back side thereof and carries the depending lever 513. Said lever has an opening in its lower end through which the plunger 509 passes and is provided with the thumb-piece 508, projecting to the right outside of said case, and with the arm 502, extending to the left of the stud 503 against the bar 501. The flat spring 514 is fastened to the right edge of the lever 513 a little below the stud 503 and extends downward below the plunger 509, the lower end of said spring having an opening for the passage of said plunger. The base of the spring 514 bears against the right face of the collar 515, rigid on the plunger 509. The vertical hooked arm 512 is pivoted to the case at 511 and also has an opening in its lower terminal for the reception of said plunger, while the upper end or hook 504 is adapted to lock over the right end of the bar 501. The spiral spring 517ª tensions the hook 504 into contiguity with the bar 501 and the base of the arm 512 against the left face of the collar 516, rigid on the right end of the plunger 509. The bar 501 is pivoted to the upper part of the sliding wall 500 and projects to the right into connection with the hook 504. The weak spring 505, introduced between the bar 501 and a lug at the top of the case 506, imparts a slight downward tension to said bar. The arrangement of the parts just described is such that when the operator presses downward on the thumb-piece 508 the bifurcated terminal of the plunger 509 is carried against the bottom space in the channel 521 by the spring 514, which bears on the collar 515, said space being thus pressed tight against the base of the wall 500. The obstruction to the space being acted upon offered by the wall 500 causes the spring 514 to yield against the continued pressure on the thumb-piece 508, and the lever 513 swings the arm 502 upward, thereby elevating the left end of the bar 501. Since the right end of the bar 501 is engaged by the hook 504, the raising of the opposite end elevates the wall 500 to make the opening 412 of sufficient size for the passage of the space. The resiliency of the spring 514 now drives the plunger 509 to the left and forces the abutting space through the opening 412. At the same time the collar 516 operates the arm 512 and swings the hook 504 against the spring 517ª and out of contact with the bar 501. The right end of the bar 501 now rises against its weak spring, the contact end of the arm 502 serving as a fulcrum, and discontinues the positive upward pressure on the wall 500, leaving the latter to retain its present temporary position by reason of the friction between the projection 500ª and the registering member. Upon releasing the thumb-piece 508 the several springs return their attached parts to the positions formerly occupied, the right end of the bar 201 being depressed by the spring 505 in time for reëngagement by the hook 504.

The general operation of the machine is as follows: After the column of loose leaded unjustified type is placed in the galley a and pressed compactly to the left with the left-hand line against the wall 201 of the channel 121 and within said channel by the hand of the operator. Glancing at the face of the type, the operator keeps the run of the reading matter of the line being acted upon in his mind and counts the places for spaces between the words therein. With his right hand on the knob 105 he turns the disk 100 until the graduation 122, which corresponds with the number of required spaces, registers with the pointer 118. The rotation of said disk operates the straight-edge or limiting-guide 400 to check the upward movement of the plunger-blade 409 and also the rod 117 to locate the fulcrum-block 113 of the proportional-bar 111, as and for the purpose previously described. The operator with his left hand next brings down the gage 120 solidly on top of the type-line in the channel 121 by means of the handle 206. The last manipulation gives a corresponding downward motion to the left end of the bar 111, which necessarily imparts an upward movement to the right end of said bar and through the medium of the connecting members raises the stepped stop-block 216. With the right hand now on the handle 417 the operator swings the arm 224 to the right in Figs. 1 and 4 until it is intercepted by one of the steps on the block 216. The plunger-blade 409 is now located behind the particular channel 123 which contains the required size of spaces and in position to thrust them from said channel into the intermediate receiving-channel 521. By this peculiar arrangement and operation of parts a pile of spaces has been selected, in readiness to be operated upon, which is equal in size to the amount of the line shortage and contains the particular number required for distribution between the several words comprised in the line. The pile of indicated spaces in front of the blade 409 is thrust into the channel 521 by pulling forward the handle 417, the tension-block 518 having been raised against the spring 517 and the pawl 510 engaged with the teeth 519 by means of the latch 518ª. The block 518 is next released and allowed to bear on the spaces which have just been introduced into the channel 521 to press them compactly together during the operation of removing the same individually from said channel. The guard 405 has prevented more than the spaces comprised in the selected pile from being removed from the adjacent channel 123. The operator swings the arm 224 to the left, bringing the channel 521 adjacent to the upper part of the line-channel 121. By means of the peculiarly-shaped rule 200, which operates in suitable slots in the wall 201, the words are raised, one at a time, from the lower terminal of the channel 121 or that portion which is at the left end of the galley $a$ beginning with the top word. Said word is first elevated above and onto the catch 202. Then the second word is raised until its top is in line with the lower part of the channel 521, when a downward pressure on the thumb-piece 508 causes the plunger 509 to thrust the bottom space in said channel through the opening 412 and a corresponding opening in the right wall of the channel 121 onto said second word. This word, with its space, is raised above the catch 202 by the rule 200 and each succeeding word in the line manipulated in a similar manner, the thumb-piece 508 being depressed each time to insert each succeeding space in the pile between the words composing said line. When the last word has been raised above the catch 202, the now justified line occupies that section of the channel 121 which is at the end of the galley $b$, and the operator removes the rule 235, transfers said line onto said galley, and replaces said rule at the right of said line, leaving said channel-section free for a new line. As each justified line is placed on the galley $b$ the accumulating column of type thereon is moved to the left. After one line has been provided with the necessary spaces the several parts of the machine are reset for action upon the next line in the galley $a$.

While the invention is designed especially for use in justifying ordinary type, it will be understood that the invention is not thus limited, but may be applied also in justifying type, matrices, or the like of any suitable material, and the word "type" is used in this specification and the claims in this broad sense. It will be understood, also, that the devices for measuring the line shortage and dividing such shortage by the number of intervals in the line to determine the proper width of justifying-spaces are applicable not only in machines for justifying composed lines of type or matrices, but in line-justifying mechanism of other classes, and the term "justifying mechanism" herein is used in this broad sense to include all classes of typographic work in which lines are to be justified for printing or the production of printing-surfaces. These calculating devices in the machine illustrated and described herein are combined with a space-magazine and devices for supplying and inserting ready-made spaces; but it will be understood that the justifying-spaces the size of which is determined by these calculating devices may be provided otherwise than by using ready-made spaces, suitable space supplying and inserting devices being combined with the calculating devices for this purpose.

What I claim as my invention, and desire to secure by Letters Patent, is—

1. In a type-justifying mechanism, the combination with a magazine for justifying-spaces having a single channel for each size of said spaces, of means constructed and operating to select the proper number and size of justifying-spaces for a line, and means to eject said spaces from the magazine simultaneously, for the purpose set forth.

2. In a type-justifying mechanism, the combination with a magazine for justifying-spaces having a single channel for each size of said spaces, of means for selecting and ejecting simultaneously from the magazine the proper number of spaces of proper size to justify a line, said means being controlled by the number of intervals in, and the measurement of, the unjustified line.

3. In a type-justifying mechanism, the combination with a space-magazine having channels for different sizes of spaces, of a gage pivoted at one side of the magazine, said gage and magazine being so proportioned and arranged that the gage will uncover simultaneously the same number of spaces in each channel of the magazine, the different sizes of spaces being arranged consecutively.

4. In a type-justifying mechanism, the combination with a magazine having a plurality of channels for different sizes of spaces, of a gage arranged across said magazine at its lower end, said gage being pivoted at one end adjacent to the magazine, and means controlled by the number of intervals in a line to be justified for swinging said gage about its pivot.

5. In a type-justifying mechanism, the combination with a magazine having channels for a plurality of sizes of spaces, of an ejecting-blade adjustable laterally and longitudinally of the magazine to register with different numbers and sizes of spaces, and a pivoted gage controlled by the number of intervals in a line and serving to determine the number of justifying-spaces to be ejected by said blade.

6. In a type-justifying mechanism, the combination with a magazine having a plurality of channels for spaces of different sizes, of an inclined gage in the rear of said magazine, means for adjusting said gage to uncover a number of spaces in each channel of the magazine corresponding to the number of intervals in the line to be justified, a space-ejecting blade movable laterally and longitudinally of the magazine-channels, means controlled by the line shortage for adjusting said blade laterally, and means for holding said blade in contact with the gage to adjust it longitudinally of the space-channels.

7. In a type-justifying mechanism, the combination with a space-magazine having channels for a plurality of sizes of spaces, of a space-ejecting blade, means controlled by the line shortage for locating said blade opposite the channel having the desired size of spaces, means controlled by the number of intervals in a line for causing said blade to register with a corresponding number of the selected spaces, and means for reciprocating the blade to eject the spaces.

8. In a type-justifying mechanism the combination with a magazine having channels for a plurality of sizes of spaces, of a space-ejecting blade, and means controlled only by the line shortage for locating the blade in register with the channel containing the proper justifying-spaces for the line under justification.

9. In a type-justifying mechanism, the combination with a magazine having a plurality of channels for justifying-spaces of different sizes, of an ejecting-blade movable laterally to register with any one of said channels, means for measuring the shortage of an unjustified line, and a stepped stop controlled by said means and operating to limit the lateral movement of the space-ejector.

10. In a justifying mechanism, in combination, a proportional lever, and means for varying the effect of the lever in accordance with the number of intervals in a line to be justified, a space-magazine, and means controlled by said lever for selecting the proper size of spaces from said magazine.

11. In a justifying mechanism, a proportional lever, and a fulcrum therefor movable relatively to said lever, in combination with means for adjusting the fulcrum in accordance with the number of intervals in a line to be justified.

12. In a justifying mechanism, a proportional lever, a fulcrum for said lever adjustable relatively thereto, means for adjusting the fulcrum in accordance with the number of intervals in a line, and means for rocking the lever upon its fulcrum in accordance with the shortage of the line.

13. In a justifying mechanism, a proportional lever, a fixed guide adjacent to said lever, a block sliding on said guide, and a fulcrum for the lever supported on said block, in combination with means for adjusting said fulcrum in accordance with the number of intervals in a line.

14. In a justifying mechanism, the combination with a proportional lever, and an adjustable fulcrum for said lever, of a cam operating to adjust said fulcrum, in accordance with the number of intervals in a line.

15. In a justifying mechanism, the combination with a proportional lever having a fulcrum capable of adjustment in accordance with the number of intervals in a line, of a measuring-gage connected to one end of said lever and movable in accordance with the shortage of an unjustified line, and means connected with the other end of said lever for selecting the proper size of spaces to justify the line.

16. In a justifying mechanism, the combination with a proportional lever, and an adjustable fulcrum therefor, of a line-measuring gage connected to one end of said lever, a series of stops connected to the opposite end of said lever, and a space-ejecting blade adjustable to the proper size of spaces by means of said stops.

17. In a type-justifying mechanism, the combination with a proportional lever, and means for shifting the fulcrum relatively to said lever in accordance with the number of intervals in a line, of a space-magazine, devices connected with said lever for measuring the shortage of an unjustified line, and means controlled by said lever for selecting justifying-spaces for the line.

18. In a type-justifying mechanism, the combination with a space-magazine, and a space-ejecting blade movable laterally thereof, of a movable support for said blade, a stepped stop adjustable to intercept said blade-support at different points of its travel, and means for adjusting said stop in accordance with the shortage of an unjustified line of type.

19. In a type-justifying mechanism, in combination with a space-magazine, a measuring or proportional bar, and a space-pile-limiting lever, of a plunger-blade adapted to be brought into operative relation with a pile of spaces of the size and number determined by said bar and lever respectively, and means to transfer said pile collectively into a working position relative to the line-channel, for the purpose set forth.

20. In a type-justifier, in combination, a gage arranged to rest upon a type-line, a proportional bar having one end connected with said gage, and a stepped block connected with the opposite end of said bar, adapted in its successive positions to limit the movement of a space-plunger blade accordingly, for the purpose set forth.

21. In a type-justifier, in combination, a proportional bar having a movable fulcrum, a graduated member adapted to locate said fulcrum in accordance with the number of intervals in a line, a gage arranged to operatively connect one end of said bar with an unjustified type-line, a space-plunger blade, and a stepped block operatively connected with the opposite end of said bar, adapted to operatively locate said blade, for the purpose set forth.

22. In a type-justifier, in combination, a graduated member provided with cam-guides, a movable fulcrum on a proportional bar and a space-pile-limiting gage-lever operated by said member with reference to the number of spaces required in a type-line, a stepped block connected with one end of said bar, the other end of the same being adapted to traverse the distance of the line shortage, and a space-plunger blade capable of being operatively located by said block and lever, for the purpose set forth.

23. In a type-justifier, in combination, a space-magazine, a space-pile-limiting gage-lever pivoted at one end and adapted to be moved at the other successively equal distances, and a space-plunger blade tensioned against said lever and elevated or depressed thereby, for the purpose set forth.

24. In a type-justifier, in combination, a space-plunger blade having a lateral movement commensurate with the selected size of spaces, a vertical movement coincident with the height of the required space-pile, and a longitudinal movement to dislodge said pile, an arm for imparting said first movement, a vertically-adjustable stepped stop for said arm, a space-pile-limiting lever against which said blade is tensioned for controlling said second movement, and a slide operating in said arm, for communicating said third movement, as specified.

25. In a type-justifier, in combination, a magazine having channels therein for spaces of successive sizes, a block provided with steps the dimensions of which in one direction are proportional to the distances between said channels, and in the other direction are commensurate with the differences between said sizes or multiples of said differences, and means whereby a space-plunger blade is located by said block in proper relation to said magazine to select justifying-spaces for a line, for the purpose set forth.

26. In a type-justifier, in combination, a magazine and an intermediate space-receiving-channel member, a movable wall to form an opening for the discharge of spaces from the channel in said member, a spring-pressed space-plunger, a bar for elevating said wall, under the influence of an arm, a hook arranged to release said bar when said plunger begins to act upon the bottom space, and to reëngage said bar at the proper time, and a lever to actuate the several parts, whereby said spaces are introduced into the type-line in the line-channel, one at a time, as set forth.

27. In a type-justifier, in combination, with a magazine and an intermediate space-receiving device, a spring-actuated block arranged to operate in the channel in said device and bear on the pile of spaces contained therein, and means for holding said block in an elevated position when more spaces are to be introduced into said channel, for the purpose set forth.

28. In a type-justifier, in combination with means for measuring a line of type, a space-magazine having a series of space-channels, a line-channel member, and an intermediate space-receiving device mounted on a movable arm, arranged to transfer a pile of spaces from any one of the channels in said magazine into operative relation with said line-channel member, a space-ejector for ejecting a pile of spaces and a gage extending across the series of space-channels to limit the number of spaces ejected, for the purpose set forth.

29. In a type-justifier, in combination with means for measuring a line of type, a space-magazine having a series of space-channels, a gage extending across the series of channels, said gage and magazine being so proportioned and arranged that the gage will uncover simultaneously the same number of spaces in each channel of the magazine, and means for adjusting said gage in accordance with the number of spaces.

30. In a type-justifier, in combination with means for measuring a line of type, a space-magazine having a series of space-channels, a gage extending across the series of channels, means for adjusting said gage in accordance with the number of spaces to determine the number of spaces removed from the channel, and a space-removing device set in accordance with the line shortage and number of spaces.

31. In a type-justifier, in combination with means for measuring a line of type, a space-magazine having a series of space-channels, a gage extending across the series of channels, a space-ejector for ejecting a pile of spaces, and means for adjusting said gage and space-ejector in accordance with the line shortage and the number of spaces to position the space-ejector for the ejection of the proper size of spaces and to position the gage for the ejection of the proper number of spaces.

32. In a justifying mechanism, in combination, a proportional lever and means for varying the effect of the lever in accordance with the number of intervals in a line to be justified, devices connected with said lever for measuring the shortage of an unjustified line, and means whereby the selection of justifying-spaces from spaces of different sizes is controlled by the movement of said lever.

33. In a type-justifying machine, a measuring-beam provided at one end with type-engaging means movable to an extent represented by the aggregate shortage or required spacing of the line, and provided with an adjustable fulcrum, with means for moving the fulcrum to a suitable position relative to the beam in accordance with the number of spaces occurring in the line, whereby the aggregate shortage of the line is converted into a suitably-related movement of the opposite end of the beam in combination with means whereby the selection of justifying-spaces from spaces of different sizes is controlled by the movement of said beam.

34. In a type-justifying machine, in combination with the spacer-selecting devices thereof, the herein-described measuring-beam provided at one end with type-engaging means arranged to move to an extent representing the aggregate shortage or deficiency of the line, a movable fulcrum, with means for moving the fulcrum to a position on the beam suitably related to the number of spaces in the line, the other end of the beam being connected with the selecting devices whereby they are set to the proper positions for the selection of the required size of spacer or spacers.

35. In a type-justifying machine, a measuring beam or lever provided with a fulcrum, and operatively connected at its end with a slide adapted to move in tangential relation to the movement of the beam upon its fulcrum, the slide being located adjacent to and adapted to engage with the line of type to be measured.

In testimony whereof I have signed my name to this specification in the presence of two subscribing witnesses.

BENJ. M. DES JARDINS.

Witnesses:
 ED. E. CLAUSSEN,
 EVA S. SHELTON.